Patented Oct. 17, 1922.

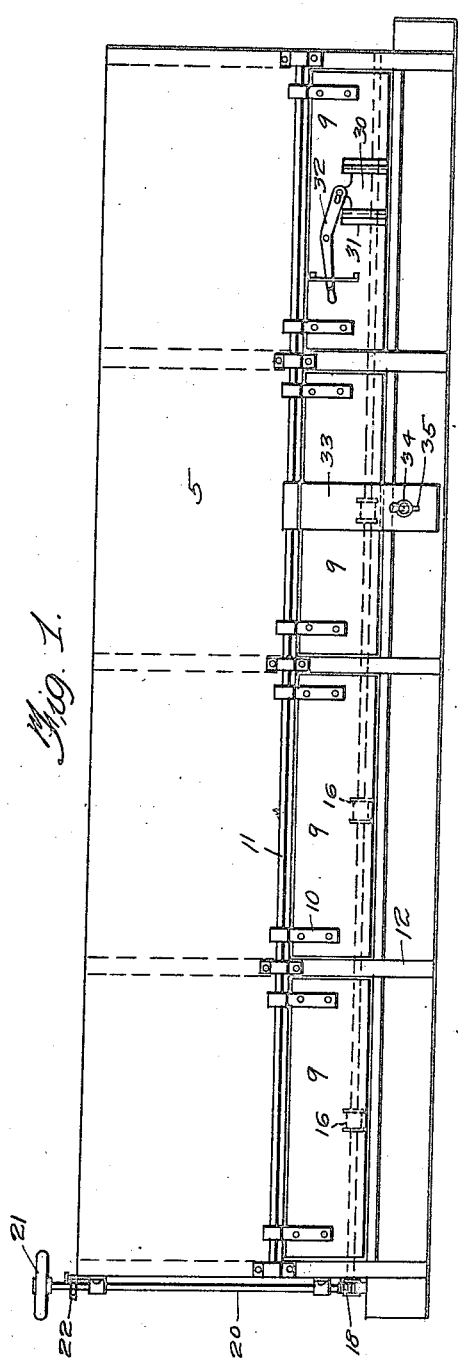
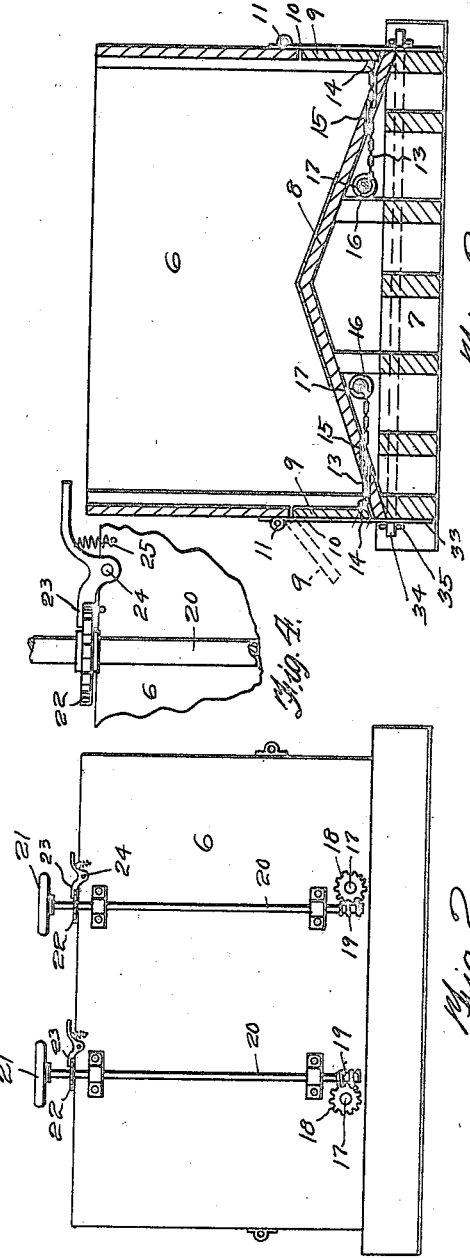

1,432,146

UNITED STATES PATENT OFFICE.

EUNOS A. ALLDREDGE, OF HOLLY POND, ALABAMA.

CAR AND DOORS THEREFOR.

Application filed May 20, 1922. Serial No. 562,284.

*To all whom it may concern:*

Be it known that I, EUNOS A. ALLDREDGE, a citizen of the United States of America, residing at Holly Pond, in the county of Cullman and State of Alabama, have invented certain new and useful Improvements in Cars and Doors Therefor, of which the following is a specification, reference being had therein to the accompanying drawings.

This invention relates to cars and doors therefor. The object of the invention is to provide a car having doors so arranged that the contents of the car may be discharged by gravity, the doors being opened by the weight of the load but being under control of the operator so that the rate of discharge of the load may be controlled. It is a further object of the invention to provide a means whereby the contents of the car or a part thereof may be discharged through an auxiliary door into a wagon without discharging the load as a whole.

Further objects and advantages of the invention will be set forth in the detailed description which follows.

In the drawings:

Fig. 1 is a side elevation of a car body constructed in accordance with the invention;

Fig. 2 is an end elevation thereof;

Fig. 3 is a transverse sectional view; and

Fig. 4 is a detail view of one of the restraining pawls hereinafter described.

Like numerals designate corresponding parts in all of the figures of the drawings.

In the drawings, 5 designates the side walls, 6 the end walls, 7 the sills and 8 the bottom of a hopper-type car. The bottom is higher at the center than at the sides and slopes in opposite directions from the center toward the sides so that the load in the car tends to move toward the sides of the car and presses against the main doors 9 which are hung by hinges 10 from a horizontal hinge rod 11. These doors are disposed between the stanchions 12 of the car, said stanchions being located at intervals in the length of the car. Thus it will be seen that the load tends to swing the doors open. The doors are held against opening movement by chains or like flexible connections 13 which are connected at 14 to the lower portions of the doors and pass through tubular guides 15 in the bottom 8. The inner ends of the chains are engaged with drums 16 carried by rotative rods 17. These rods extend the full length of the car and each rod carries a worm wheel 18 at its outer end, said worm wheel being engaged by worms 19 upon the lower ends of vertical shafts 20. These shafts carry operating hand wheels 21 upon their upper ends. They also carry ratchet wheels 22 which are engaged by vertically arranged pawls 23. These pawls are pivoted at 24 and are forced into engagement with the ratchet wheels by springs 25. The rear ends of the pawls are disposed in such position that a brakeman or other operator may, by stepping upon these rear ends, lift the front ends of the pawls out of engagement with the ratchet wheels 22 and thus permit the shafts 20 to turn, if the hand wheels 21 be manipulated. It will be observed that the worm and worm wheel connection is such that the weight of the load on the doors cannot jerk the operating hand wheels out of the hands of the operator. In other words, the operator must impart a positive turning movement to the shafts 20 before the doors can move to open position and the same is true with respect to the movement of the doors to closed position, the operator must positively turn these hand wheels in order to secure this result. The doors move to closed position by gravity but the weight of the doors is not sufficient to turn the hand wheels through the worm connection. Any turning of the hand wheels must be designedly brought about by the operator. Thus there is no danger of the load jerking the hand wheels out of the hands of the operator and throwing him to the ground. He can by proper manipulation of these hand wheels permit the doors to open very gradually and thus controllably discharge the load in the manner best suited to serve the purposes sought. For example, in discharging ballast along a railroad track, proper manipulation of the doors will permit the load to be discharged in such a way as to scatter it along the track, if desired, instead of being all dumped in one spot.

It is at times desired to discharge part of a load into wagons without discharging the main load and I may, if desired, provide the main doors with auxiliary doors, such as are indicated at 30. These doors are slidably disposed in guideways 31 and are operated by levers 32.

Futhermore I may, if desired, provide a positive lock for the main doors during transit by hanging a keeper bar 33 from the hinge rod 11 and engaging the lower end of this keeper rod, temporarily, with the outer end of a tie rod 34, the end of the tie rod passing through the keeper bar and being secured by a pin or like suitable element 35.

It is to be understood that the invention is not limited to the precise construction set forth but that it includes within its purview whatever changes fairly come within either the terms or the spirit of the appended claims.

Having described my invention what I claim is:

1. A car having a plurality of doors hinged along their upper edges and disposed adjacent the lower sides of said car, said car being provided with a bottom which slopes in opposite directions from the center, rotative horizontally disposed rods carried by the car, flexible connections wound upon said rods and engaged with the lower portions of the doors, vertical operating rods with hand wheels and worms disposed between the operating rods and the horizontal rods.

2. In combination a car body having a plurality of horizontally hinged doors disposed along the lower portions of its sides, said car body comprising a bottom which slopes in opposite directions from the center, tubular guides passing horizontally through the sloping bottom, flexible connections passing through said tubular guides and engaged with said doors horizontally disposed rotative rods with which the inner ends of said flexible connections are engaged, worm wheels upon the outer ends of said rods and outwardly of the end of the car, vertical operating rods carrying worms which engage with said worm wheels and operating elements upon the upper ends of said rod.

3. A structure as recited in claim 2 in combination with vertically operating pawls and ratchet wheels carried by said rods with which said pawls coact, said pawls being movable out of engagement with said ratchet wheels when stepped upon.

4. A structure as recited in claim 2 in combination with auxiliary doors carried by said main doors.

In testimony whereof I hereunto affix my signature.

EUNOS A. ALLDREDGE.